Figure 1:
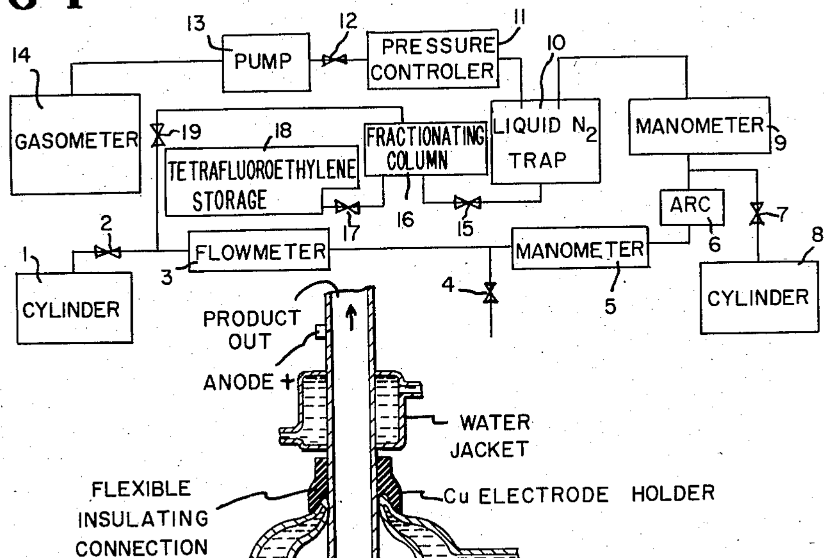

July 14, 1959 M. W. FARLOW ET AL 2,894,996

PREPARATION OF FLUORINE-CONTAINING COMPOUNDS

Filed May 16, 1955 2 Sheets-Sheet 1

INVENTORS
MARK WENDELL FARLOW
EARL LEONARD MUETTERTIES
BY Ambrose McAlevy
ATTORNEY

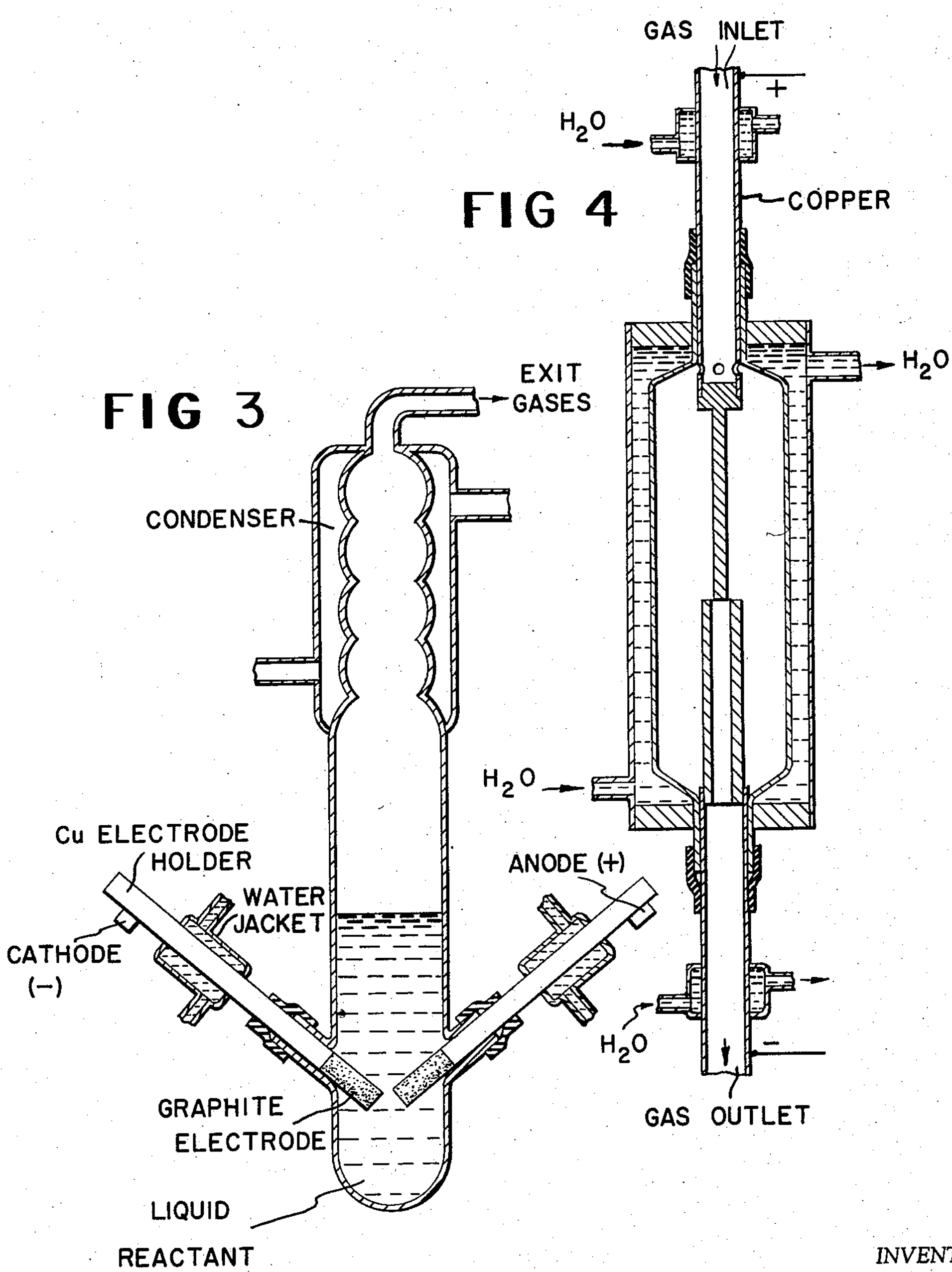
INVENTORS
MARK WENDELL FARLOW
EARL LEONARD MUETTERTIES
BY Ambrose McAlevy
ATTORNEY United States Patent Office 2,894,996

Patented July 14, 1959

2,894,996

PREPARATION OF FLUORINE-CONTAINING COMPOUNDS

Mark Wendell Farlow, Wilmington, and Earl Leonard Muetterties, Hockessin, Del., assignors to E. I. du Pont de Nemours and Company, Wilmington, Del., a corporation of Delaware Application May 16, 1955, Serial No. 508,576

9 Claims. (Cl. 260—653.3)

This invention relates to a new process for preparing fluorine-containing compounds, particularly fluorocarbons, and other related products formed simultaneously therewith. This application is a continuation-in-part of our copending application S.N. 420,472, filed April 1, 1954, now Patent No. 2,709,189.

Compounds containing only fluorine and carbon, which are known as fluorocarbons, possess considerable utility in many fields of applied chemistry, for example, as refrigerants, dielectric fluids, intermediates for polymeric materials, propellants in aerosol compositions, etc. One of these fluorocarbons, tetrafluoroethylene, has achieved commercial success in the form of its polymers. However, wider uses for tetrafluoroethylene and other fluorocarbons would be attained were there more economical methods for their preparation.

The present invention is directed to a process for the preparation of tetrafluoroethylene which comprises heating, at a temperature of at least 1500° C., a compound comprising carbon, fluorine, and at least one other element of the class consisting of oxygen, sulfur, and nitrogen, said compound containing at least three fluorine atoms per molecule.

In particular embodiments the said compound may be one in which any element present in addition to those mentioned is hydrogen or halogen in minor amounts. The atomic ratio of fluorine to the said other element or elements is generally at least 1:1. Mixtures containing more than one of the aforesaid compounds may be used if desired.

The heating of the fluoro compound may take place in the presence of carbon if desired, and this is most generally preferred when certain types of reactants are used, as described hereinbelow.

The reaction gives a mixture of products, the principal fluorocarbons being tetrafluoroethylene, carbon tetrafluoride and hexafluoroethane, together with minor amounts of hexafluoropropene, octafluorocyclobutane, and octafluoropropane. Gaseous carbon oxides, e.g., carbon dioxide and carbon monoxide, are formed as by-products in the reaction when the reactant contains oxygen in addition to carbon and fluorine. Under some conditions when oxygen is present in the fluorocompound reactant, carbonyl fluoride is formed in significant amounts. When the fluoro compound reactant contains sulfur, carbon bisulfide is formed and when this reactant contains nitrogen, $N_2$ and $(CN)_2$ are generally produced.

In preparing tetrafluoroethylene by the process of this invention it is not necessary, for good results, to employ carbon as a reactant if the fluoro compound has an optimum ratio of carbon to the other elements present. Thus, when the fluoro compound contains enough carbon to form tetrafluoroethylene and the concomitant pyrolysis by-products, it is not necessary to carry out the pyrolysis in the presence of carbon. For example, in the pyrolysis of trifluoroacetic acid, as shown by the following equation, carbon is not required:

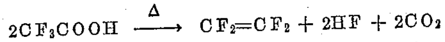

$$2CF_3COOH \xrightarrow{\Delta} CF_2{=}CF_2 + 2HF + 2CO_2$$

On the other hand, when the fluoro compound reactant does not provide sufficient carbon to form the tetrafluoroethylene and the by-products from the other elements in the compound, it is necessary, for good results, to employ carbon as a reactant. This is illustrated by the following equation for the pyrolysis of di(trifluoromethyl) ether:

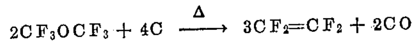

$$2CF_3OCF_3 + 4C \xrightarrow{\Delta} 3CF_2{=}CF_2 + 2CO$$

The process of this invention can be carried out in various ways. In one embodiment, the reaction of the fluoro compounds of the above-defined type to form tetrafluoroethylene can be accomplished by passing the fluoro compound through a reaction zone heated to a temperature of 1500–4000° C. The reaction zone can be a hollow tube of refractory material heated externally to the desired temperature by conventional means, or the liquid or gaseous fluoro compound reactant can be exposed to an electric arc. Especially good results are obtained by passing the fluoro compound reactant through an arc produced between carbon electrodes, in which case the temperature is estimated to be between 2500 and 4000° C. Good results are also obtained by passing the fluoro compound reactant through an induction heated graphite tube, where reaction zone temperatures of 2500° C. or more are obtained. The reactor tube can be heated in any suitable manner, e.g., by an electric resistance or induction furnace. The gaseous reaction products can then be passed through cold condensers, or traps, to isolate liquid reaction products. When tetrafluoroethylene is the desired fluorocarbon, it is preferable to cool the hot reaction products rapidly to a temperature below 400° C. The time of transition from the reaction temperature to 400° C. should not exceed one second and is preferably in the range of 0.1 to 0.001 second, or less, to obtain best yields of tetrafluoroethylene. The liquefied fluorocarbons and any unreacted starting material can be separated by fractional distillation in efficient fractionating columns. Optionally, the crude reaction products can be passed through aqueous solutions of an alkali, e.g., sodium hydroxide, to cool the reaction products and to absorb any acidic by-products. Moreover, it is sometimes desirable to employ an acceptor for free halogen, such as sodium iodide, or an acceptor for hydrogen fluoride, such as an alkali metal or alkaline earth metal fluoride.

An embodiment of the process of this invention which is particularly useful when the starting fluorine-containing carbon compound is liquid at ordinary temperatures consists in submerging a carbon arc in the liquid fluorine-containing carbon compound. In this particular process the fluorine-containing reactant is vaporized by the arc, and may react with the carbon of the arc, and is then very rapidly cooled by the surrounding liquid reactant.

To obtain most efficient operation of this process, it is desirable to recycle any unreacted starting material and any undesired fluorocarbon products. Thus, to obtain highest yields of tetrafluoroethylene from the reaction of carbon with a fluorine-containing compound such as, for example, trifluoroacetic acid, any unreacted trifluoroacetic acid is recycled. The fluorocarbon by-products from the first pass through the heated reaction zone are recycled, preferably at temperatures above 1500° C. The fluorocarbon by-products having one to two carbons may be converted to tetrafluoroethylene during the recycling step by a process described in application Serial No. 477,678, filed December 27, 1954, by M. W. Farlow, now Patent No. 2,709,192, and the fluorocarbon by-products having three or more carbon atoms are converted to tetrafluoroethylene during the recycling step by a process described in Application Serial No. 390,461, filed November 6, 1953, by M. W. Farlow, now Patent No. 2,709,182.

The reaction temperature can be high as can practically be obtained by known means. Temperatures above 1500° C. represent a preferred embodiment since they lead to higher conversions per pass and increase the proportions of the highly valuable tetrafluoroethylene in the reaction product. When carbon is employed as a reactant, the relative proportion of carbon to other reactant is not critical. However, when carbon is used, it is desirable for economic reasons to have the carbon present in excess in order to utilize to the greatest extent the more expensive fluorine-containing carbon compound.

The pressure at which the reaction is carried out can be varied over wide limits. Satisfactory results can be obtained at pressures ranging from as low as 1 mm. of mercury absolute, or lower, up to superatmospheric pressures. Atmospheric and superatmospheric pressures are useful when it is desired to carry out the reaction with submerged electrodes.

The fluorine-containing carbon compound used as reactant in the process of this invention need not be rigorously pure. Commercially available materials or compounds made by known methods are entirely suitable. Anhydrous reactants are not essential; however, it is preferable to use reactants substantially free of moisture.

Any form of carbon, either amorphous or crystalline, is suitable for use in the process of this invention. Thus, there can be used coal, graphite, diamond, charcoal, and the various forms of carbon black, such as lamp black, acetylene black, bone black, etc. The powdered forms of carbon are, of course, used as packings in the form of pellets or on supports, such as coke. In general, best results are obtained with active carbon, of which many well-known varieties are available commercially. In general, active carbon is very finely divided porous carbon having a total surface area of at least 20 square meters per gram (Hassler, "Active Carbon," Chemical Publishing Company, 1951, page 127). When a carbon arc is used in the process, the activity or state of subdivision of the carbon is apparently of no consequence, but the carbon must, of course, possess sufficient conductivity.

Figure 2:
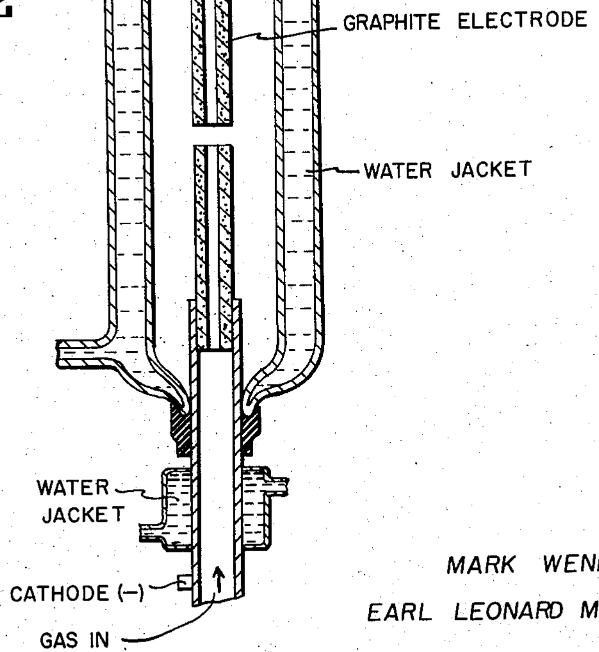

A flow sheet of the equipment and process used in reacting a compound of carbon, fluorine, and at least one other element with the electrodes of a carbon arc is shown in Figure 1. A detail of an arc used with gaseous reactants is shown in Figure 2. A detail of a type of apparatus having a carbon arc submerged in liquid fluorine-containing reactant is shown in Figure 3. Another form of apparatus which can be used is shown in Figure 4.

Referring to Figure 1, the gas lines are of copper tubing. In a typical operation the compound of carbon, fluorine, and another element is contained in cylinder or tank 1. Valves 2, 4, 15, and 19 are closed, and valves 7 and 12 are opened. The apparatus is evacuated by means of pump 13 to remove the air, trap 10 is cooled with liquid nitrogen, valve 7 is closed, argon (or other inert gas) is admitted through valve 4 to the desired operating pressure, and pressure controller 11 is set to maintain that desired pressure. The arc 6 is struck, the reactant gas is passed through the arc at the desired rate (flowmeter 3) and the product is condensed in trap 10, except noncondensable gases which pass through controller 11, pump 13, and into gas reservoir 14. During operation the arc inlet pressure (manometer 5) will be appreciably higher than the exit pressure (manometer 9) because of the constriction involved in the arc passages. When it is desired to stop the reaction, the arc current is cut off, valves 2 and 12 are closed, valve 7 is opened, cylinder 8 is cooled with liquid nitrogen, and trap 10 is allowed to warm to room temperature, and the volatile product is distilled into cylinder 8. Finally, if desired, cylinder 8 can be pumped to remove traces of argon, or other noncondensables, after which the cylinder valve 7 is closed and the product is allowed to warm to room temperature.

In continuous operation where unreacted starting material and fluorocarbon by-products are recycled, the trap 10 is connected through valve 15 to fractionating column 16 which separates, as far as possible, the tetrafluoroethylene from the reaction products of the arc, sends the tetrafluoroethylene of greater or less purity, depending on the grade desired, to tetrafluoroethylene storage 18 and returns the remaining starting material and fluorocarbon by-products through valve 19 and flowmeter 3 to the arc 6. If desired, the by-products before being sent back into the arc 6 can be passed through an alkaline scrubber to remove acidic gases such as carbon dioxide.

A detail of an arc suitable for use with gaseous reactants is shown in Figure 2. The electrodes consist of graphite cylinders. The water jackets are made of electrically nonconductive material, or if they are made of electrically conductive material they are insulated from the electrode holders. The arc is struck by contacting the two electrodes through manipulation of one of the two flexible rubber connections, care being taken to avoid contact with uninsulated portions of the apparatus. Thereafter the electrode gap is controlled to effect the requisite current. Either direct or alternating current can be applied across the electrodes at widely varying voltages. In the case of alternating current, the frequency of the current can be varied over a wide range. Good results are obtained when a direct current of 10 to 30 amperes at 10 to 50 volts is employed. However, the process is not limited to the use of this narrow range of amperage and voltage.

Referring to Figure 3, a detail is given of apparatus having a carbon arc submerged in a liquid reactant. In this type of apparatus the pyrolysis products are rapidly cooled to the temperature of the refluxing liquid reactant. In this apparatus the arc is operated in the same manner as described in the preceding paragraph.

Referring to Figure 4, a detail is given of a type of carbon arc equipment which is very efficient and which gives very high conversions to fluorocarbons of the compounds of carbon, fluorine and at least one other element as defined previously. In this equipment one electrode is hollow and the other is solid. The gaseous reactants enter the reaction chamber through holes in the upper electrode holder, pass around the solid electrode and between the adjacent ends of the two electrodes and then out through the center of the hollow electrode. When the solid electrode is smaller in diameter than the inner diameter of the hollow electrode, the arc can be operated with the end of the solid electrode a short distance above the end of the hollow electrode, parallel with the end of the hollow electrode, or extending into the center of the hollow electrode. The exact position selected is dependent on the particular reactant being passed through the arc, the position being chosen which provides the best arc under operating conditions. The relative positions of the two electrodes can be changed, if desired, during operation. This is sometimes necessary to maintain the optimum arc. The solid electrode can also be larger in diameter than the inner diameter of the hollow electrode. If desired, it can even be larger than the outer diameter of the hollow electrode. The solid electrode is designated as the anode in the drawing; however, it can be the cathode and the hollow electrode can be the anode, if desired.

An induction heated graphite tube suitable for use in the process of this invention is described in detail in U.S.

patent application S.N. 477,678, filed December 27, 1954, now Patent No. 2,709,192.

The process of the invention is illustrated further by means of the following examples.

*Example I*

Trifluoroacetic acid vapor is passed through an induction-heated graphite tube furnace of the type described in U.S. application Serial No. 477,678, filed December 27, 1954, by M. W. Farlow, now Patent No. 2,709,192. This furnace has a graphite tube three-quarters inch in inside diameter and fourteen inches long packed in the center with four inches of granular graphite of 4–8 mesh size. The reaction zone is maintained at 950° C. The rate of flow of the trifluoroacetic acid is 143 g./hour with an inlet pressure of 50 mm. of mercury, absolute, and an exit pressure of 14 mm. of mercury, absolute. The gaseous reaction product, after passage through a tower containing dry sodium fluoride, which removes hydrogen fluoride, contains the following constituents in the indicated molar percentages.

| Product: | Mole percent |
|---|---|
| Tetrafluoroethylene | 14 |
| Carbonyl fluoride | 21 |
| Carbon tetrafluoride | 4 |
| $C_2F_6$ and higher fluorocarbons | 5 |
| Carbon dioxide | 55 |

*Example II*

Trifluoroacetic acid is passed through a carbon arc in apparatus of the type illustrated in Fig. 4. The arc is operated at 26–28 volts and 15–16 amperes direct current. The exit gases from the reactor are first passed through a tower containing sodium fluoride pellets to remove any hydrogen fluoride formed in the reaction and are then immediately passed into a cold trap which is cooled by liquid nitrogen. During a period of 24 minutes, 3.1 grams of trifluoroacetic acid at an arc inlet pressure of about 8 mm. mercury, absolute, is passed through the arc. There is recovered in the liquid nitrogen trap 1.4 grams of material which is shown by infrared analysis to consist of 75 mole percent tetrafluoroethylene, 10 mole percent carbon tetrafluoride, 10 mole percent hexafluoroethane, trace amounts of carbon dioxide, less than 5 mole percent octafluoropropane and less than 1 mole percent hexafluoropropene.

*Example III*

Trifluoroacetonitrile is passed through an induction-heated graphite tube furnace of the type used in Example I at a rate of about 140 g./hour. The reaction zone is maintained at 2000° C., the inlet pressure is 75 mm. of mercury, absolute, and the exit pressure is 20 mm. of mercury, absolute. The product that is collected in the liquid nitrogen trap consists mainly of tetrafluoroethylene, carbon tetrafluoride, hexafluoroethane and higher fluorocarbons, and unchanged trifluoroacetonitrile in a molar ratio of about 8, 11, 2, and 3, respectively. The uncondensed reaction product is chiefly nitrogen.

*Example IV*

Tri(perfluorobutyl)amine is heated by a carbon arc in a submerged arc reactor of the type illustrated by Fig. 3. The reactor is connected to a water-cooled condenser and about 100 grams of tri(perfluorobutyl)amine is added with the electrodes completely immersed in the amine. The arc is operated at 20 volts and 20 amperes direct current for a period of 8 minutes. In a cold trap cooled with liquid nitrogen and connected to the exit of the condenser is recovered 13 grams of reaction product. This product is analyzed by its infrared absorption spectrum and it is found to contain 20–30 mole percent of tetrafluoroethylene, 20–40 mole percent of hexafluoroethane, 10 mole percent of octafluoropropane, and trace amounts of octafluorocyclobutane and carbon tetrafluoride.

*Example V*

Bistrifluoromethyl disulfide is reacted with the carbon of a carbon arc of the vapor phase apparatus illustrated by Fig. 4. In this apparatus the reaction product gases are immediately led to a liquid nitrogen trap. The bistrifluoromethyl disulfide is introduced into the arc at an inlet pressure of 8 mm. of mercury, absolute, and the arc is operated at 20–25 volts and 15–18 amperes direct current. During a period of ten minutes, a total of 3.1 grams of the disulfied is passed through the arc, and there is recovered in the liquid nitrogen trap 3.1 grams of reaction product. Infrared absorption analysis of this material shows it to consist of 20–30 mole percent tetrafluoroethylene, 50 mole percent carbon tetrafluoride, 15 mole percent hexafluoroethane, less than 5 mole percent octafluoropropane, less than 1 mole percent hexafluoropropene, and about 5 mole percent of carbonyl sulfide. There are also small amounts of sulfur dioxide and carbon disulfide and a possible trace of carbon dioxide.

*Example VI*

In this example a perfluoro cyclic ether, perfluoro-(2-n-propyl-1-oxacyclohexane) is heated by the carbon electrodes of a submerged carbon arc of the type illustrated by Fig. 3. The apparatus and procedure are essentially the same as that described in Example IV. The reactor is charged with 53 grams of perfluoro-(2-n-propyl-1-oxacyclohexane) saturated with iodine. The arc is operated at 15–17 volts and 20–22 amperes direct current for a period of six minutes. There is recovered in the liquid nitrogen trap 19 grams of material. Infrared analysis of this material shows it to consist of 30–50 mole percent tetrafluoroethylene, about 10 mole percent carbon tetrafluoride, 5–10 mole percent carbonyl fluoride, less than 1 mole percent silicon tetrafluoride, 1–5 mole percent hexafluoropropene, 1–5 mole percent octafluoropropane, 30 mole percent hexafluoroethane, and a trace amount of carbon dioxide.

The examples have illustrated this invention by the pyrolysis of particular fluorine-containing compounds in the presence of a carbon arc or in an induction heated graphite tube furnace. However, the process can be carried out by heating any compound of the kind hereinabove set forth, at a temperature of at least 1500° C.

The manner in which the various elements in the fluorine-containing carbon compound are joined is not critical. At the temperature at which the reaction is carried out, fluorocarbons, including tetrafluoroethylene, are formed. Consequently, a wide variety of fluorine-containing carbon compounds are operable. Specific examples of compounds that can be used in the process of this invention include: bis(trifluoromethyl)sulfide, trifluoronitrosomethane, trifluoroacetic anhydride, trifluoroacetyl fluoride, perfluorocyclohexane carbonyl fluoride, perfluorostearoyl fluoride, perfluoromethanol ($CF_3OF$), perfluoromethyl mercaptan ($CF_3SF$), perfluoromethylamine($CF_3NF_2$), perfluorobenzoic acid, trifluoroacetyl chloride, di(trifluoromethyl)amine, di(perfluoromethyl) ether, di(perfluoromethyl)ketone, azo-(trifluoromethane), perfluorocyclohexyl nitrogen difluoride, and trifluoromethyl sulfur pentafluoride.

We claim:

1. A process for the preparation of fluorocarbons which comprises heating a reactant composed of carbon, fluorine and at least one other element of the class consisting of oxygen, sulfur and nitrogen, said reactant containing at least three fluorine atoms per molecule, and continuing said heating at a temperature of at least 1500° C. until a fluorocarbon is produced, and separating the said fluorocarbon from the resulting mixture.

2. A process for the preparation of fluorocarbons which comprises heating carbon with a reactant composed of carbon, fluorine and at least one other element of the class consisting of oxygen, sulfur and nitrogen, said reactant containing at least three fluorine atoms per molecule, and continuing said heating at a temperature of at least 1500° C. until a fluorocarbon is produced, and separating the said fluorocarbon from the resulting mixture.

3. Process of claim 1 wherein the said reactant contains carbon, fluorine, said other element, and minor amounts of a member of the class consisting of hydrogen and halogen other than fluorine, as part of the reactant molecule.

4. Process of claim 1 wherein the said reactant contains carbon, fluorine and oxygen.

5. Process of claim 4 wherein the said reactant is trifluoroacetic acid.

6. Process of claim 1 wherein the said reactant is a trifluoroacetonitrile.

7. Process of claim 2 in which the said reactant is passed through a carbon arc at a temperature of 2500° to 4000° C.

8. A process for production of tetrafluoroethylene according to claim 7 which comprises conducting trifluoroacetic acid through a carbon arc at subatmospheric pressure, cooling the resulting product from arc temperature to below 400° C. in less than one second, whereby a mixed product containing tetrafluoroethylene is produced, and thereafter separating tetrafluoroethylene from the resulting mixture.

9. Process of claim 8 wherein the effluent gas is conducted through an alkali metal fluoride acceptor for hydrogen fluoride, prior to separating tetrafluoroethylene from the reaction products.

References Cited in the file of this patent

UNITED STATES PATENTS

| | | |
|---|---|---|
| 2,709,182 | Farlow | May 24, 1955 |
| 2,709,189 | Farlow et al. | May 24, 1955 |
| 2,773,089 | Anderson | Dec. 4, 1956 |

OTHER REFERENCES

Dennis et al.: Jour. Amer. Chem. Soc., vol. 53, pp. 3263–69 (1931).